(12) United States Patent
Zhang

(10) Patent No.: US 8,695,096 B1
(45) Date of Patent: Apr. 8, 2014

(54) AUTOMATIC SIGNATURE GENERATION FOR MALICIOUS PDF FILES

(75) Inventor: Liang Zhang, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 86 days.

(21) Appl. No.: 13/115,036

(22) Filed: May 24, 2011

(51) Int. Cl.
*G06F 21/60* (2013.01)
*G06F 21/56* (2013.01)
*H04L 29/06* (2006.01)

(52) U.S. Cl.
CPC ............... *G06F 21/60* (2013.01); *G06F 21/56* (2013.01); *H04L 63/12* (2013.01)
USPC ............. 726/24; 707/692; 707/811; 707/771; 707/755

(58) Field of Classification Search
USPC ............. 726/22; 715/201, 209, 234; 707/708, 707/741, 748, 755, 771, 830, 953, 952; 717/140–144
See application file for complete search history.

(56) References Cited

U.S. PATENT DOCUMENTS

| | | | |
|---|---|---|---|
| 7,747,943 B2 * | 6/2010 | Bargeron et al. ............. | 715/235 |
| 8,151,352 B1 | 4/2012 | Novitchi | |
| 8,176,556 B1 * | 5/2012 | Farrokh et al. ................. | 726/23 |
| 8,185,954 B2 * | 5/2012 | Scales ............................. | 726/22 |
| 8,307,351 B2 * | 11/2012 | Weigert ........................ | 717/141 |
| 2002/0118644 A1 | 8/2002 | Moir | |
| 2005/0203919 A1 * | 9/2005 | Deutsch et al. ............... | 707/100 |
| 2007/0016953 A1 * | 1/2007 | Morris et al. .................... | 726/24 |
| 2007/0118350 A1 | 5/2007 | van der Made | |
| 2007/0192866 A1 * | 8/2007 | Sagoo et al. .................... | 726/24 |
| 2007/0263241 A1 * | 11/2007 | Nakayama ................... | 358/1.13 |
| 2008/0005782 A1 | 1/2008 | Aziz | |
| 2008/0016570 A1 | 1/2008 | Capalik | |
| 2008/0133540 A1 | 6/2008 | Hubbard et al. | |
| 2008/0183691 A1 * | 7/2008 | Kwok et al. ...................... | 707/5 |
| 2008/0196104 A1 | 8/2008 | Tuvell et al. | |
| 2008/0209557 A1 | 8/2008 | Herley et al. | |
| 2008/0222729 A1 | 9/2008 | Chen et al. | |
| 2008/0231885 A1 * | 9/2008 | Truong et al. ................. | 358/1.15 |
| 2008/0289028 A1 | 11/2008 | Jansen et al. | |
| 2009/0013405 A1 * | 1/2009 | Schipka .......................... | 726/22 |
| 2009/0064337 A1 * | 3/2009 | Chien ............................. | 726/25 |
| 2009/0094697 A1 | 4/2009 | Provos et al. | |
| 2009/0126016 A1 | 5/2009 | Sobko et al. | |
| 2010/0077476 A1 | 3/2010 | Adams | |
| 2010/0077481 A1 | 3/2010 | Polyakov et al. | |
| 2010/0115621 A1 * | 5/2010 | Staniford et al. ............... | 726/25 |
| 2010/0146615 A1 | 6/2010 | Locasto et al. | |
| 2010/0217801 A1 | 8/2010 | Leighton et al. | |
| 2010/0218253 A1 * | 8/2010 | Sutton et al. .................... | 726/23 |

(Continued)

OTHER PUBLICATIONS

Alexandre Bloce, Eric Filiol; Portable Docuement Format (pdf) Security Analysis and Malware Threats.*

(Continued)

*Primary Examiner* — Cordelia Zecher
*Assistant Examiner* — Richard McCoy
(74) *Attorney, Agent, or Firm* — Van Pelt, Yi & James LLP

(57) ABSTRACT

In some embodiments, automatic signature generation for malicious PDF files includes: parsing a PDF file to extract script stream data embedded in the PDF file; determining whether the extracted script stream data within the PDF file is malicious; and automatically generating a signature for the PDF file.

26 Claims, 9 Drawing Sheets

(56) References Cited

U.S. PATENT DOCUMENTS

| | | |
|---|---|---|
| 2011/0041179 A1 | 2/2011 | St. Hlberg |
| 2011/0078794 A1 | 3/2011 | Manni et al. |
| 2011/0099633 A1 | 4/2011 | Aziz |
| 2011/0209038 A1* | 8/2011 | Travieso et al. ............... 715/205 |
| 2011/0219448 A1 | 9/2011 | Sreedharan et al. |
| 2011/0247072 A1* | 10/2011 | Staniford et al. ............... 726/24 |
| 2011/0276699 A1 | 11/2011 | Pedersen |
| 2011/0321160 A1* | 12/2011 | Mohandas et al. ............... 726/22 |
| 2012/0023112 A1* | 1/2012 | Levow et al. ................. 707/749 |
| 2012/0054866 A1 | 3/2012 | Evans et al. |
| 2012/0180132 A1 | 7/2012 | Wu |
| 2012/0222121 A1* | 8/2012 | Staniford et al. ............... 726/24 |

OTHER PUBLICATIONS

Alme et al., McAfee Anti-Malware Engines: Values and Technologies. 2010 http://www.mcafee.com/us/resources/reports/rp-anti-malware-engines.pdf.

\* cited by examiner

AUTOMATIC SIGNATURE GENERATION FOR MALICIOUS PDF FILES

BACKGROUND OF THE INVENTION

Portable Document Format (PDF) types of files are becoming more prevalent. Commonly, PDF files are sent through email or downloaded from various websites. PDF files also include JavaScript support. The addition of JavaScript to PDF files has allowed users to customize their PDF files (e.g., to manipulate their PDF files by, for example, modifying the appearance of such files, or providing dynamic form or user interface capabilities). However, malware can also attempt to exploit PDF files. For example, a malicious virus can be embedded within PDF files or accessible via the content of a PDF file, such as through an embedded JavaScript.

Identification of malicious PDF files is typically manually performed, such as by a security researcher or security analyst. For example, malicious PDF files can be manually inspected for the malicious elements so that malware elements can be detected in subsequent PDF files to determine whether the PDF files are malicious. However, given the numerous variations of malicious elements within a PDF file, manual identification of the malicious elements can be laborious and time consuming.

BRIEF DESCRIPTION OF THE DRAWINGS

Various embodiments of the invention are disclosed in the following detailed description and the accompanying drawings.

DETAILED DESCRIPTION

Figure 1:
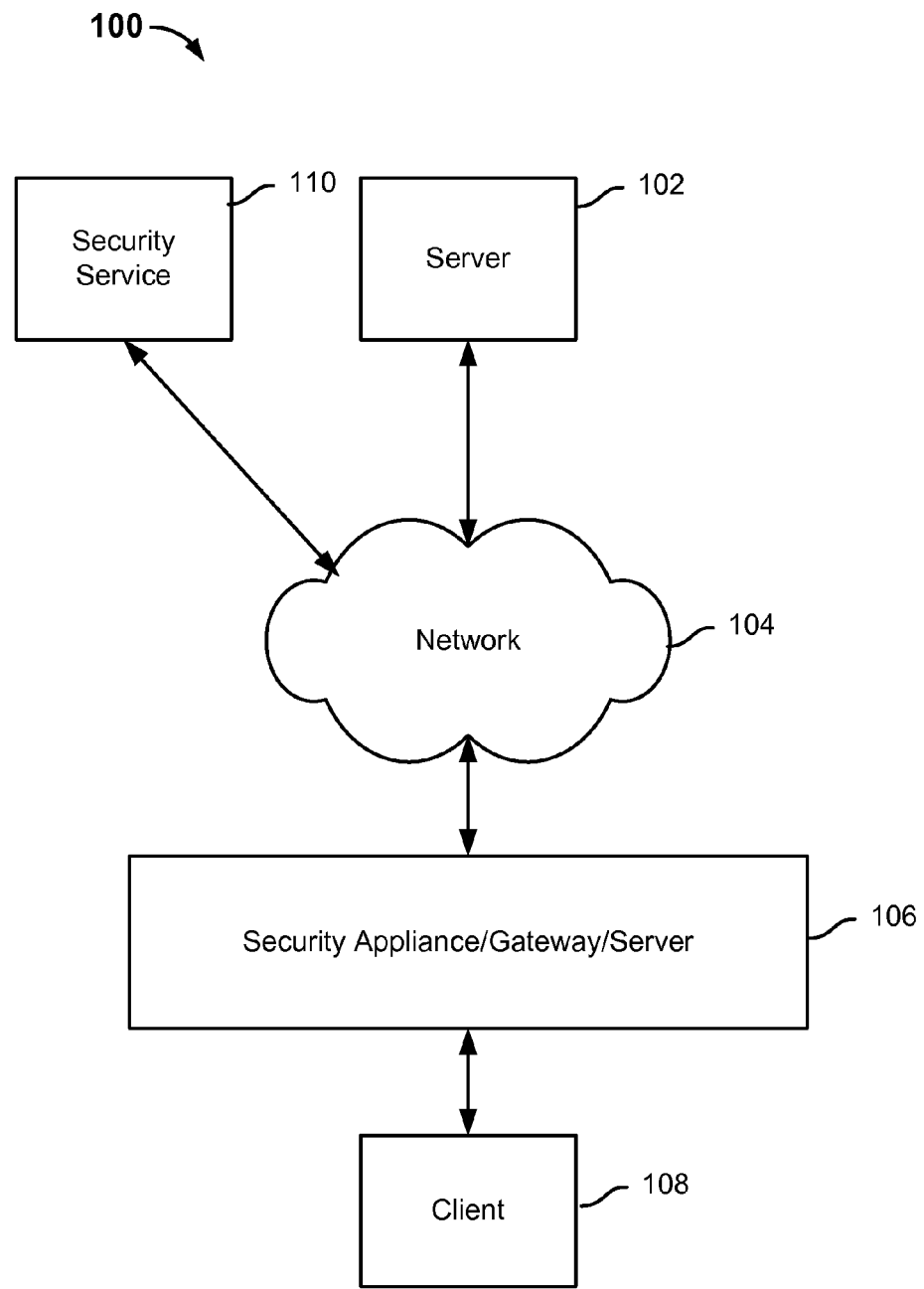
FIG. 1 is a diagram of a system for generating malicious PDF file signatures in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

PDF files that include malicious content can be received as email attachments or downloaded from websites, for example. In some instances, a PDF reader (e.g., Adobe Acrobat® Reader) can be vulnerable to malware embedded within and/or associated with a malicious PDF file. For example, a PDF reader that is configured to start automatically if a web page has an embedded PDF file is potentially vulnerable to an attack associated with the PDF file if the file includes malicious content. Once the malicious PDF file is opened, the malicious content included in the PDF (e.g., scripted in JavaScript, and assuming that the PDF reader is configured with JavaScript enabled) can download viruses or other undesirable content to infect the device on which the PDF file is being viewed. For example, malicious content included in the PDF can download viruses from a web page, access a device's file system and create unwanted files or write to the registry, and/or generate numerous pop-up windows.

PDF files that are known to include malicious content can be collected at a source (e.g., a third party service or a source internal to the service that is generating signatures of malicious PDF files) that is recognized to be trustworthy. Such PDF files obtained from this source can be analyzed to create signatures that can be used to match against PDF files of unknown statuses (e.g., malicious or not malicious). Generation of signatures associated with PDF files that are known to be malicious is generally performed manually, including, for example, requiring engineers to analyze individual PDF files to locate the one or more malicious elements and then use these elements to create signatures. As the volume of known malicious PDF files increases, manual generation of signatures becomes more difficult, time consuming, expensive, and delays the time for signature generation and distribution for preventing malware infections and spreading. What is needed is a more efficient way of generating malicious PDF file signatures.

Automatic generation of malicious PDF file signatures is disclosed. In various embodiments, a PDF file that is known to include malicious content is received (e.g., from a trusted source). The PDF file is de-obfuscated, if appropriate, and parsed. If the PDF file is detected to include script (e.g., JavaScript), it is scanned using a malicious script detection engine for malicious JavaScript elements. In some embodiments, a signature is generated using patterns identified within one or more script portions of the PDF file. If a signature was not generated using patterns identified within one or more script portions of the PDF file and/or there is no script included in the PDF file, then a signature is generated using portions of the PDF file related to a cross-reference table of the PDF file. In some embodiments, the generated signatures are used to detect whether subsequently received PDF files are malicious. For example, if a subsequently received PDF file matches a signature, then it is determined that the PDF file is likely to be malicious in nature. But if a subsequently received PDF file does not match a signature, then one or more other techniques can be applied to the PDF file to determine whether it is malicious, for example.

FIG. 1 is a diagram of a system for generating malicious PDF file signatures in accordance with some embodiments. In the example shown, system 100 includes server 102, network 104, security appliance/gateway/server 106, and client 108. Network 104 includes high speed data networks and/or telecommunication networks. In some embodiments, server 102, security appliance/gateway/server 106, and client 108 communicate back and forth via network 104. In some embodiments, security appliance/gateway/server 106 includes a data appliance (e.g., a security appliance), a gateway (e.g., a security server), a server (e.g., a server that executes security software, including a malicious PDF file detector), and/or some other security device, which, for example, can be implemented using computing hardware, software, or various combinations thereof. In various embodiments, information (e.g., PDF files) that is sent to and/or sent from client 108 is scanned by security appliance/gateway/server 106 (e.g., for malicious PDF files).

Server 102 is configured to pass information back and forth to client 108. While only one server (server 102) is shown in the example of system 100, any number of servers can be in communication with client 108. Examples of client 108 include a desktop computer, laptop computer, smart phone, tablet device, and any other types of computing devices with network communication capabilities. In some embodiments, a server such as server 102 can be a device through which users can send messages (e.g., emails) to client 108. In some embodiments, server 102 is configured to provide client 108 with a web-related service (e.g., website, cloud based services, streaming services, or email service), peer-to-peer related service (e.g., file sharing), IRC service (e.g., chat service), and/or any other service that can be delivered via network 104.

Security appliance/gateway/server 106 is configured to automatically generate signatures associated with malicious PDF files. In various embodiments, security appliance/gateway/server 106 is configured to use the generated signatures and/or otherwise obtained signatures to identify whether a PDF file that is potentially malicious is malicious based on a comparison to the signatures. For example, in a detection process, if the potentially malicious PDF file matches one or more signatures, then it is determined that the malicious PDF file is malicious (e.g., and should be blocked, cleaned, and/or an alert should be sent to the intended recipient of the PDF file).

In various embodiments, appliance/gateway/server 106 is configured to generate signatures with malicious PDF files by analyzing PDF files that are known to be malicious (e.g., include malware). For example, malicious PDF files can be initially processed (e.g., by one or more of decryption, de-obfuscation, and/or parsing) and checked for whether they contain script (e.g., JavaScript). If a malicious PDF file includes script, then the PDF file is scanned for malicious script elements and potentially (e.g., if usable patterns can be identified), a signature is generated. If the malicious PDF file does not include script and/or a signature is not generated using a script scanning process, then a signature is generated based on a cross reference table associated with the PDF file. In various embodiments, the generated signatures can be stored and referenced for future comparisons to PDF files of unknown states of being malicious or not malicious. In some embodiments, the new signature for a malicious PDF that is an automatically generated signature at security appliance/gateway/server 106 can also be sent to security service 110 (e.g., and in some cases the malicious PDF file sample can also be sent to security service 110 for security service 110 to automatically generate a signature). Security service 110 can perform additional testing and/or analysis of the new signature. Also, security service 110 can distribute the new signature to other security devices and/or security software (e.g., from this same and/or other customers of the security service provider/security vendor).

In some embodiments, security appliance/gateway/server 106 is configured to send potentially malicious PDF files detected during scanning to security service 110. For example, security service 110 can be provided by a vendor that provides software and content updates (e.g., signature and heuristic updates) to security appliance/gateway/server 106. Security service 110 can perform the various techniques for automatic signature generation for PDF files, as described herein. For example, using the various techniques for automatic signature generation for PDF files as described herein can provide for a more efficient, timely, and less expensive security response for generating new signatures for malicious PDF files. The automatically generated signatures for PDF files can then be distributed to various security devices, such as security appliance/gateway/server 106. In various embodiments, security appliance/gateway/server 106 is configured to use the generated signatures and/or otherwise obtained signatures to identify whether a PDF file that is potentially malicious is malicious based on a comparison to the signatures. For example, in a detection process, if the potentially malicious PDF file matches one or more signatures, then it is determined that the PDF file is malicious (e.g., and should be blocked, cleaned, and/or an alert should be sent to the intended recipient of the PDF file).

In some embodiments, security appliance/gateway/server 106 is configured to receive information (e.g., emails, data packets) sent to client 108 prior to the passing of information to client 108. In some embodiments, security appliance/gateway/server 106 makes a determination, based on the content of the information, regarding whether it should be forwarded to client 108 and/or if further processing is required. For example, the information can include PDF files (e.g., included as an email attachment or embedded within content related to a web page) that security appliance/gateway/server 106 can scan with signatures of malicious PDF files to determine whether the received PDF files are malicious (e.g., the PDF files match one or more of the signatures). If a PDF file is malicious, then it may be blocked, discarded, and/or cleaned. In some embodiments, security appliance/gateway/server 106 is configured to perform similar determinations for information that is sent by client 108 to other devices (e.g., server 102) prior to the information being sent.

Figure 2:
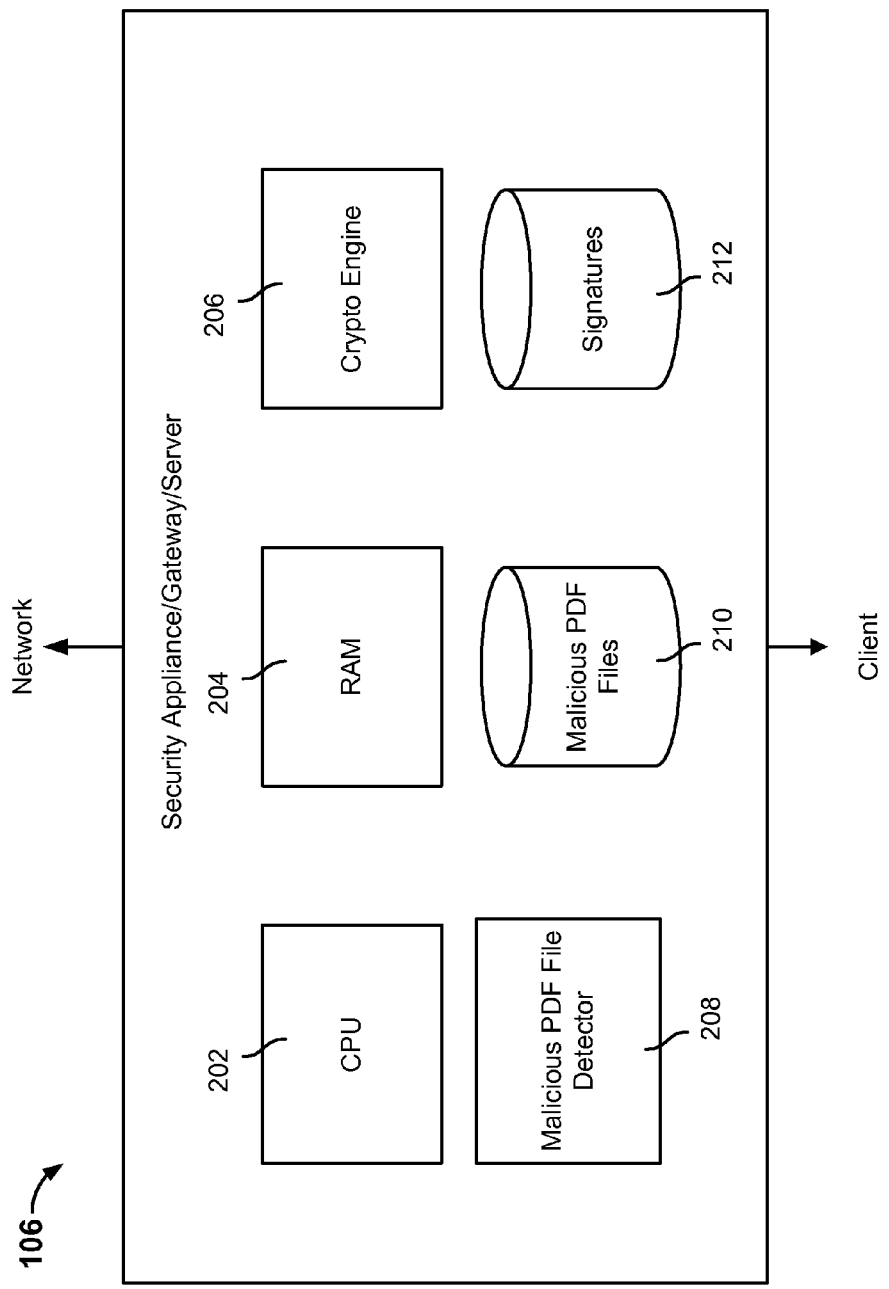
FIG. 2 is diagram showing an example of a security appliance/gateway/server in accordance with some embodiments.

FIG. 2 is diagram showing an example of a security appliance/gateway/server in accordance with some embodiments. In some embodiments, the example of FIG. 2 is used to represent the physical components that can be included in security appliance/gateway/server 106 of FIG. 1. In this example, the security appliance/gateway/server includes a high performance multi-core CPU 202 and RAM 204. The security appliance/gateway/server can also include a cryptographic engine 206 to perform encryption and decryption. The security appliance/gateway/server can also include malicious PDF file detector 208, malicious PDF files 210, and signatures 212.

In some embodiments, malicious PDF files 210 include PDF files that are known to include malicious content. Malicious PDF files 210 can be implemented using one or more databases at one or more storage devices. For example, malicious PDF files 210 can include PDF files that are determined to be malicious by a trusted source and also imported from that source. In some embodiments, the trusted source can be external to the service supporting the security appliance/gateway/server or internal to that service. Malicious PDF files 210 can be updated over time, as more PDF files are identified, and transferred to the security appliance/gateway/server.

In some embodiments, malicious PDF file detector 208 is configured to use malicious PDF files 210 to generate signatures associated with malicious PDF files. In some embodiments, malicious file detector 208 generates signatures that are stored with signatures 212. Signatures 212 can be implemented using one or more databases at one or more storage devices. In some embodiments, in addition to the signatures generated by malicious PDF file detector 208, signatures 212 can include signatures obtained through other means (e.g., copied from a library or input by an administrator of the security appliance/gateway/server). In some embodiments, malicious PDF file detector 208 can also share signatures of signatures 212 with other devices (e.g., other clients and/or a security cloud service).

In various embodiments, malicious PDF file detector 208 is configured to use signatures (e.g., from signatures data store 212) to detect whether a potentially malicious PDF file is matching (e.g., using signature matching). In some embodiments, if malicious PDF file detector 208 determines that a signature (e.g., from signatures 212) matches a potentially malicious PDF file, then malicious PDF file detector 208 would determine that the PDF file is malicious. In some embodiments, a PDF file that is determined to be malicious by signature matching that is performed by malicious PDF file detector 208 is further processed (e.g., discarded, stored for analysis, blocked, and/or an alert is sent to the recipient user of the PDF file).

Figure 3:
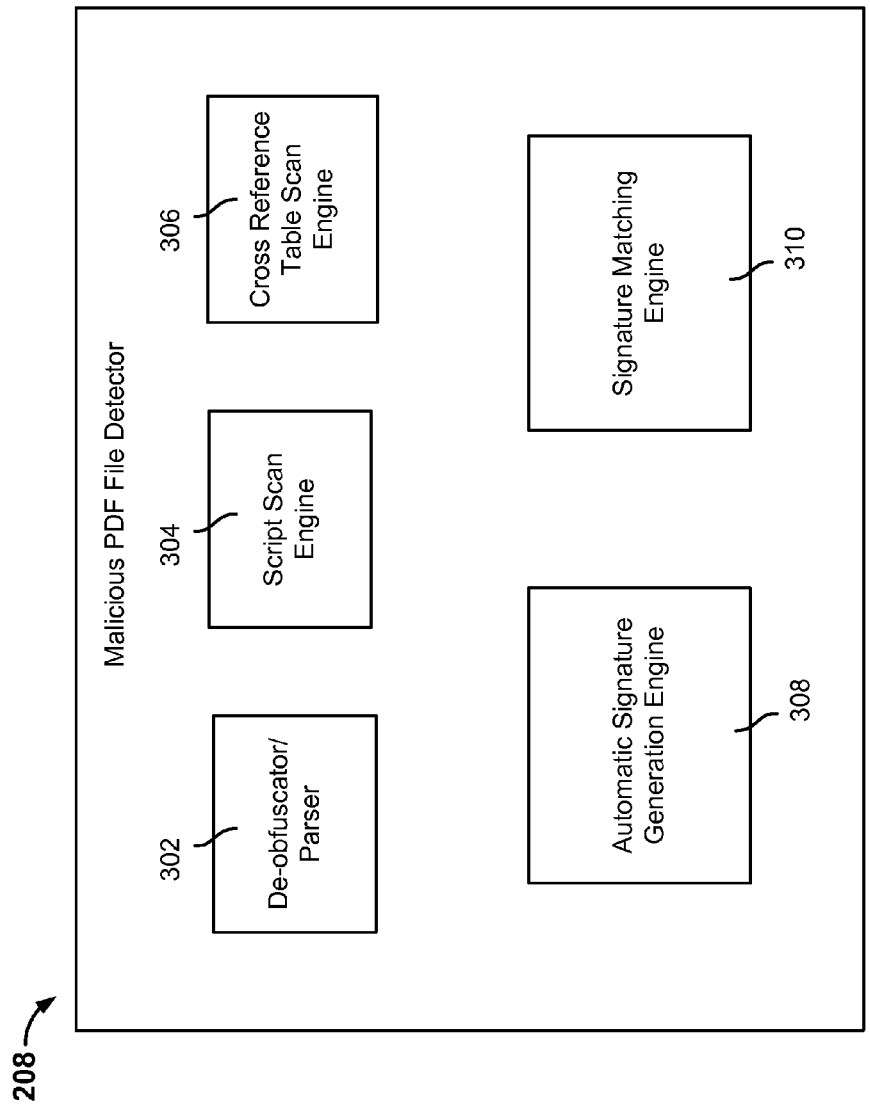
FIG. 3 is a diagram showing an example of a malicious PDF file detector in accordance with some embodiments.

FIG. 3 is a diagram showing an example of a malicious PDF file detector in accordance with some embodiments. In some embodiments, malicious PDF file detector 208 of FIG. 2 can be implemented using the example of FIG. 3. In the example shown, the malicious PDF file detector includes de-obfuscator 302, script scan engine 304, cross reference table scan engine 306, automatic signature generation engine 308 (e.g., signature generator), and signature matching engine 310. For example, these components can be implemented using software, hardware, or a combination of both software and hardware.

De-obfuscator/parser 302 is configured to de-obfuscate and parse a PDF file. In some embodiments, a PDF file that is known to be malicious is de-obfuscated and parsed before a signature can be generated from the file. Sometimes, a malicious PDF file is obfuscated (e.g., by the attacker who introduced the malicious elements into the PDF file) so that the file is difficult to read (e.g., so as to conceal any malicious elements). For example, script included in a PDF file can be obfuscated by means of Microsoft Script Encoder or a published script obfuscation tool that is readily available on the internet. De-obfuscator/parser 302 would then de-obfuscate a PDF file (e.g., to make it readable to humans) if it is detected that the PDF file is obfuscated, using one or more known de-obfuscation techniques. In some embodiments, de-obfuscator/parser 302 is also configured to decode and/or decrypt the PDF file, if appropriate. The de-obfuscated PDF file is then parsed (e.g., using a Python-based computer program) to extract the stream object description information and stream data. In some embodiments, the PDF file is parsed to produce a tree structure that contains the full object reference table and/or the normalized stream data.

Script scan engine 304 is configured to scan the portions of the parsed PDF file to determine which, if any, areas are malicious. In some embodiments, prior to scanning portions of the PDF file, script scan engine 304 (or in some embodiments, de-obfuscator/parser 302) is configured to extract only the portions (e.g., objects) of the PDF file that include script (e.g., JavaScript) data. Then these extracted portions of the PDF file are scanned. In some embodiments, values or points (e.g., determined by heuristics analysis) are assigned to each malicious element detected by script scan engine 304. After all the extracted portions of the PDF are scanned and points are assigned to the detected malicious elements, the assigned points are aggregated to determine whether the aggregate value exceeds a threshold value. If the threshold value is exceeded, then it is determined that a signature (e.g., a signature for a malicious PDF file) is to be generated, based on at least a portion of the detected malicious elements. In some embodiments, script scan engine 304 passes information to be used to generate a signature to signature generator 308.

Cross reference table scan engine 306 is configured to scan the parsed PDF file for a cross reference table (also referred to, in some embodiments, as "xref" table). In various embodiments, the PDF file is scanned from the bottom up, and the first xref table located from the bottom of the file (e.g., because this xref table is presumed to be the most recently/updated appended table) is used to generate a signature. Once the xref table is located, the table is scanned for two continuous in use (i.e., "not free") reference objects. In some embodiments, the two continuous in use reference objects are also determined to both have corresponding offsets greater than a certain value (e.g., 100). In some embodiments, the reference to the start of the xref table (e.g., startxref object) is located in the PDF file. Then one or both of the two continuous in use reference objects of the xref table (e.g., with offsets greater than a certain value) and the located startxref object are used to generate a signature. For example, if both the startxref object and the two continuous in use reference objects are used to generate a signature, the signature can include two patterns; one pattern derived at least in part from the startxref object and another pattern that is derived at least in part from the two continuous in use references. In some embodiments, cross reference table scan engine 306 passes information to be used to generate a signature to signature generator 308.

Signature generator 308 is configured to generate one or more signatures using information supplied from script scan engine 304 and cross reference table scan engine 306. For example, signature generator 308 can receive from script scan engine 304 portions of malicious script, and from cross reference table scan engine 306 reference objects. In some embodiments, signature generator 308 also receives information from sources other than script scan engine 304 and cross reference table scan engine 306 to generate signatures. In some embodiments, signature generator 308 stores the generated signatures in a data store (e.g., signatures 212 of FIG. 2).

Signature matcher 310 is configured to match stored signatures (e.g., from signatures 212 of FIG. 2) against received PDF files and/or PDF files to be sent (e.g., by a client device). For example, for a given received or to be sent PDF file, signature matcher 310 can match at least a subset of stored signatures against the PDF file. If a match is found between the PDF file and a compared signature (e.g., that identifies one or more malicious PDF files), then the PDF file is determined to be malicious. In some embodiments, a PDF file that is determined to match one or more signatures is considered to be malicious and signature matcher 310 is configured to initiate another process with respect to the PDF file (e.g., discard the PDF file, block the sender of the file, clean the malicious elements of the PDF).

Figure 4:
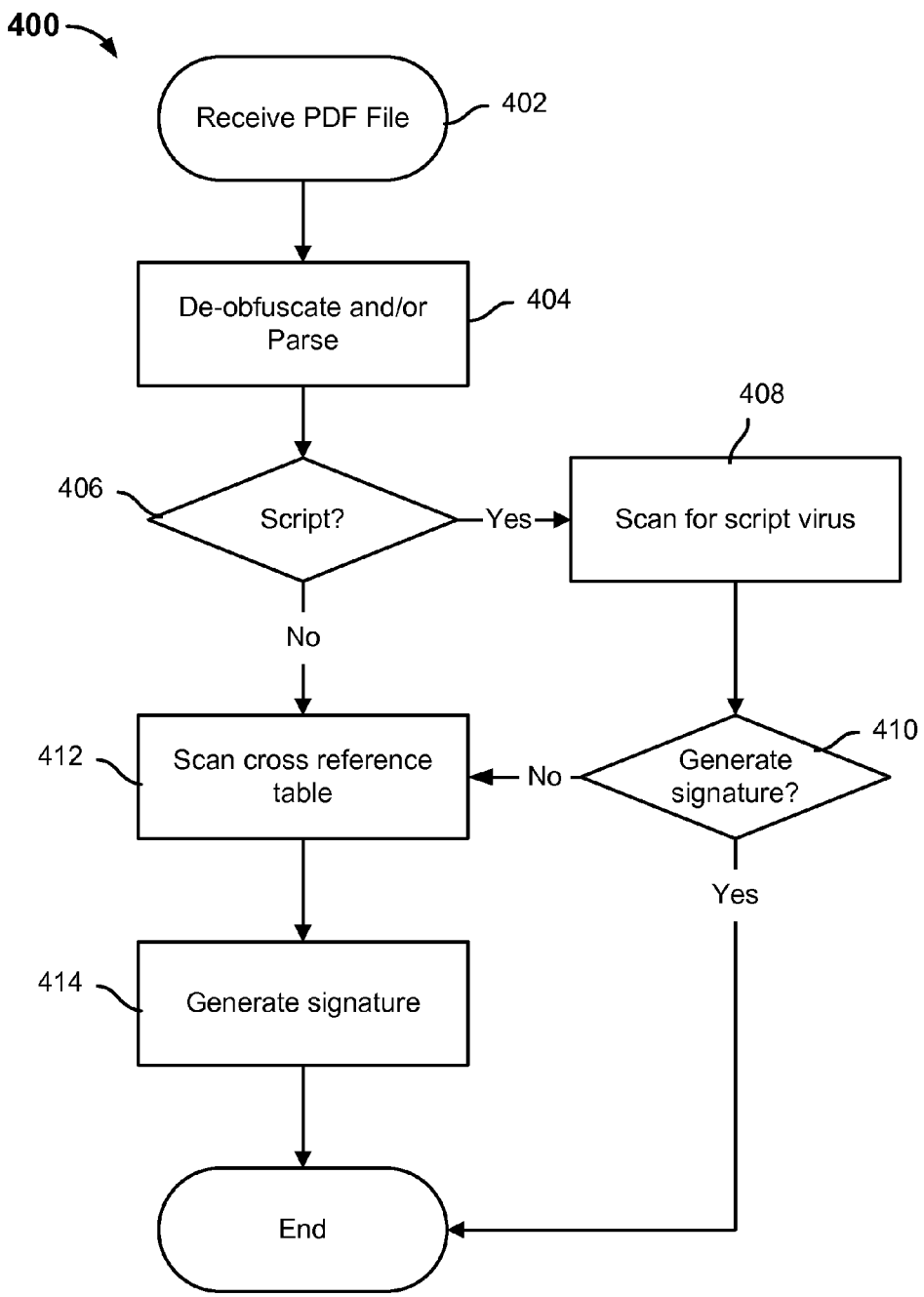
FIG. 4 is a flow diagram showing a process of scanning PDF files and generating signatures of malicious PDF files in accordance with some embodiments.

FIG. 4 is a flow diagram showing a process of scanning PDF files and generating signatures of malicious PDF files in accordance with some embodiments. In some embodiments, process 400 can be implemented, at least in part, using system 100. In some embodiments, process 400 is repeated for a predetermined number of iterations periodically (e.g., every day). In some embodiments, process 400 repeats continuously until there are no more PDF files to scan and from which to generate signatures and/or the system is shut down.

At 402, a PDF file is received. In various embodiments, the PDF file is known to include malicious content (e.g., a virus). For example, the PDF file can be received from a trusted source that stores or collects PDF files that have already been identified as being malicious (e.g., based on various techniques, such as heuristic and/or other malware determination-based techniques). At 404, the PDF file is de-obfuscated and/or parsed. In some embodiments, it is detected whether the PDF file is obfuscated (e.g., made difficult to read by an obfuscation software application). If the PDF file is detected as being obfuscated, then it is de-obfuscated (e.g., through known de-obfuscation techniques). The de-obfuscated PDF file (or PDF file that did not require de-obfuscation) is parsed to extract various portions of the PDF file (e.g., header, bod(ies), xref table(s), trailers(s)). One or more parsing techniques can be used to extract data from the PDF file, such that data can be parsed at one or more granularities (e.g., the PDF file can be parsed into a list of objects of the body section, script stream data, and/or into all the various portions of a typical PDF file structure).

At 406, the parsed PDF file is checked for script data. In some embodiments, the parsed PDF file specifically checked for JavaScript data. If script is found in the parsed PDF file, then control passes to 408. Otherwise, if script is not found in the parsed PDF file, then control passes to 412.

At 408, the parsed PDF file that is determined to include script (e.g., JavaScript) is scanned for a script virus. In some embodiments, the parsed PDF file is scanned for one or more malicious elements within the portions of the file that include script (e.g., objects of the PDF file that are associated with JavaScript). In some embodiments, malicious elements are determined based on heuristic analysis. In some embodiments, whether a signature is to be generated using at least a portion of the identified malicious elements is determined using a scoring system. For example, if an aggregate of points assigned to the one or more detected malicious elements exceeds a certain threshold, then a signature is to be generated based on at least a portion of the identified malicious elements. If a signature is to be generated based on at least a portion of the identified malicious elements, the process 400 ends. But if a signature is not to be generated based on at least a portion of the identified malicious elements, then control passes to 412.

At 412, a cross reference table associated with the parsed PDF file is scanned. In some embodiments, a PDF file includes one or more cross reference (xref) tables. In some embodiments, the one or more xref tables are identified by the parsing at 404. Because PDF files support incremental saves, new/modified content added to the PDF file is successively appended at the end of the PDF file. Each incremental save can result in an updated xref table appended to the end of the existing PDF file. In some embodiments, it is presumed that the last xref table from the bottom/end of the PDF file includes information that is associated with malicious content that is added onto the original PDF file. In some embodiments, the last xref from the bottom/end of the PDF is located. In some embodiments, content from the located xref table (e.g., reference objects) is used to generate a signature at 414. In some embodiments, content that refers to the xref table (e.g., startxref object) is also (e.g., in addition or in place of content from the xref table) used to generate a signature at 414.

Figure 5A:
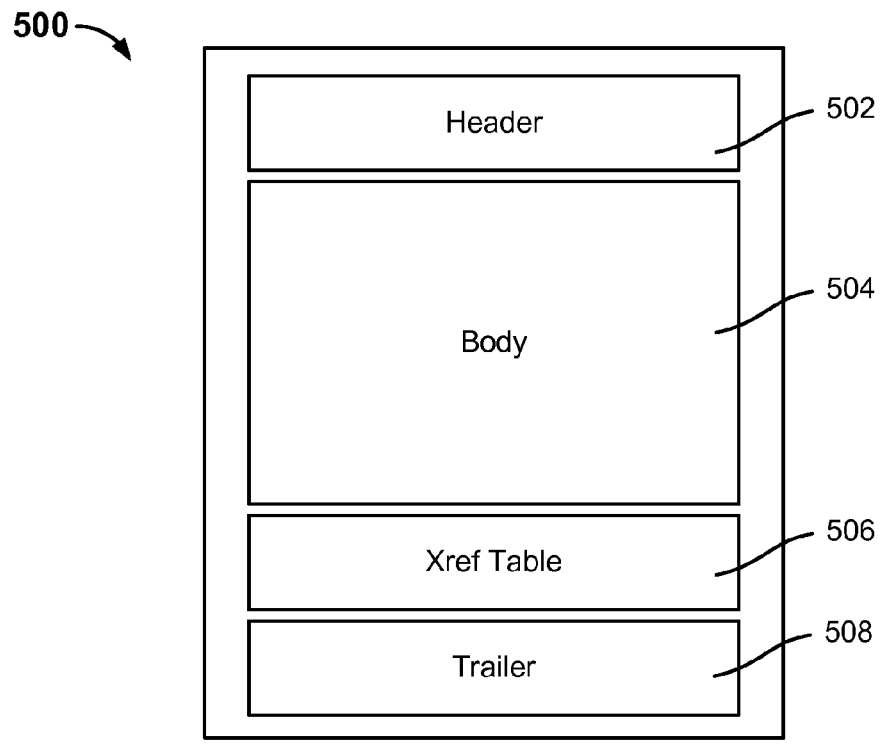
FIG. 5A illustrates an example of the structure of a PDF file in accordance with some embodiments.

FIG. 5A illustrates an example of the structure of a PDF file in accordance with some embodiments. In the example shown, PDF file 500 includes the following components: header 502, body 504, xref table 506, and trailer 508. In some embodiments, a PDF file can include more or fewer components than the ones shown in the example. Header 502 identifies the document as a PDF document. Body 504 is a collection of objects and can be arranged as a tree describing, for example, the page structure, the pages and content (e.g., text, graphics) on the pages of the PDF file. Each object has at least three components: a number, a fixed position in the PDF file (e.g., an offset), and content. Xref table 506 is a collection of pointers to the individual objects contained in body 504. In some embodiments, xref table 506 allows a PDF parser or PDF reader to quickly access the objects of the PDF file. More about the xref table is described below in FIG. 8B. Trailer 508 includes a reference (e.g., pointer) to the start of the xref table (e.g., xref table 506) and, in some embodiments, one or more objects that are relatively more essential to the PDF file.

Figure 5B:
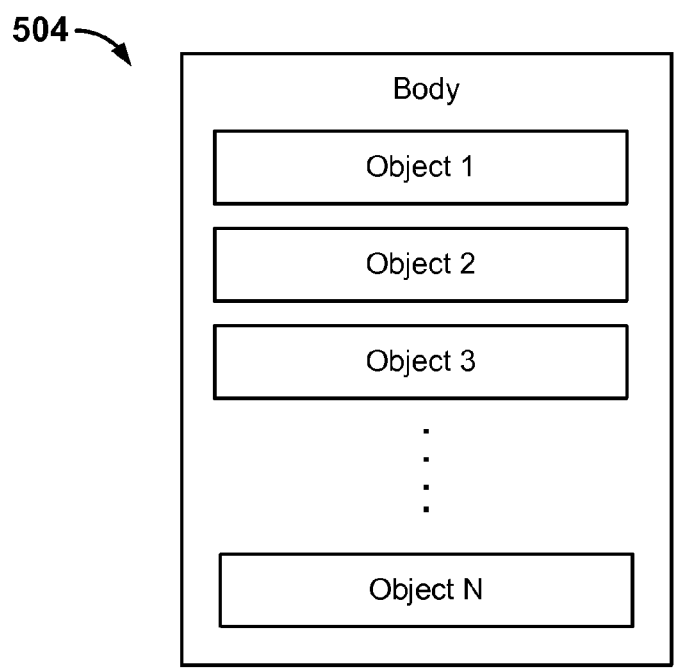
FIG. 5B illustrates an example of a body section of a PDF file in accordance with some embodiments.

FIG. 5B illustrates an example of a body section of a PDF file in accordance with some embodiments. In some embodiments, the example of FIG. 5B is an example of body 504 of PDF file 500. As shown in the example, the body section of the PDF file can include objects such as object 1, object 2, object 3 to object N. In some embodiments, the PDF file can be parsed such that each of the objects (object 1, object 2, object 3 to object N) is extracted out and can be individually inspected. In some embodiments, at least a subset of objects of the body of the PDF file can include script (e.g., JavaScript).

Figure 6:
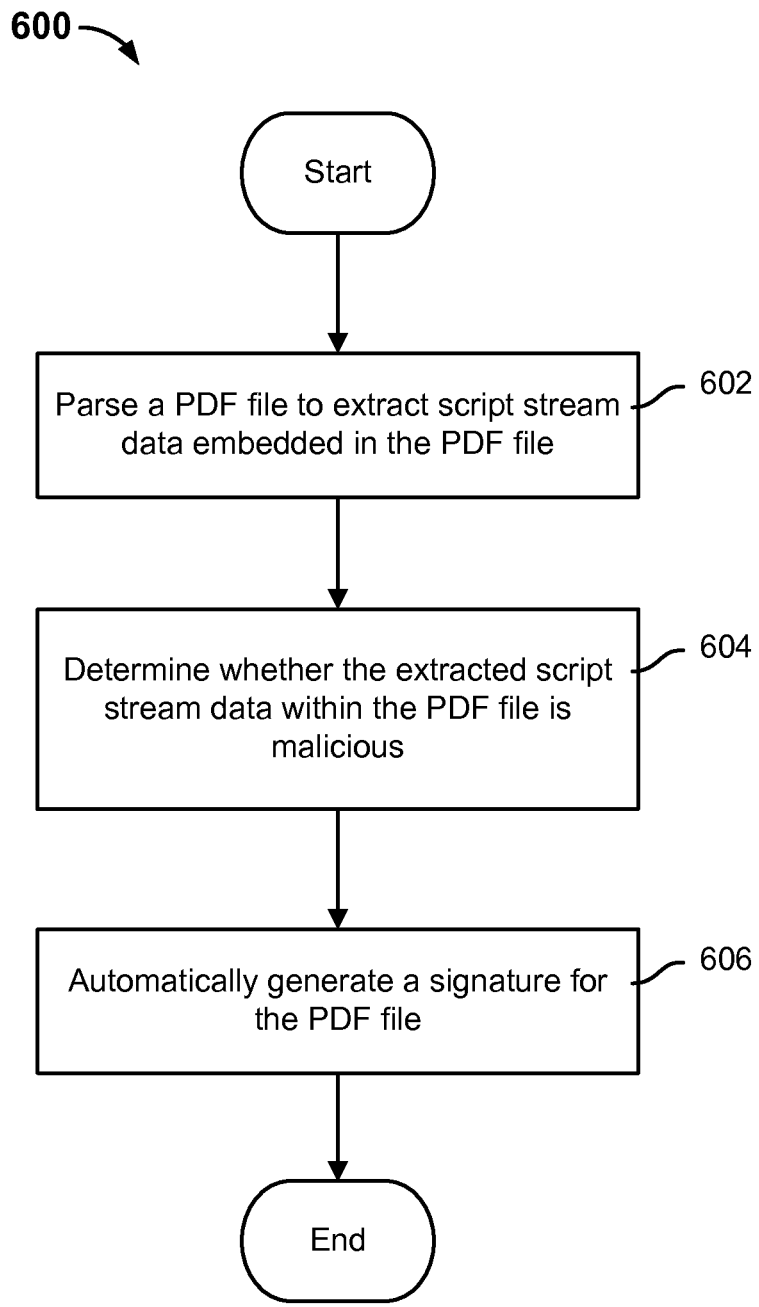
FIG. 6 is a flow diagram showing a process for generating malicious PDF file signatures in accordance with some embodiments.

FIG. 6 is a flow diagram showing a process for generating malicious PDF file signatures in accordance with some embodiments. In some embodiments, process 600 can be implemented, at least in part, using system 100.

At 602, a PDF file is parsed to extract script stream data embedded in the PDF file. In some embodiments, prior to parsing the PDF file, the PDF file is first de-obfuscated. In various embodiments, the PDF file is known to be malicious and/or is received from a source that stores PDF files that are already identified as being malicious. In some embodiments, the PDF file is parsed using known parsing techniques. For example, parsing techniques used to parse PDF files can differ from those used to parse other types of files (e.g., HTML) because a PDF file itself can include other file types (e.g., JavaScript, font, pictures). Also, a PDF file can support various compressions and/or encoding that can make extracting data from it more challenging than from other types of files. In some embodiments, the objects (e.g., within the body section)

of the PDF file are parsed out and those objects that are associated with JavaScript are identified. In some embodiments, script (e.g., JavaScript) is encoded and embedded in one or more PDF stream objects and such objects are referred to as stream script data.

At 604, it is determined whether the extracted script stream data within the PDF file is malicious. In some embodiments, the extracted script stream data is analyzed object by object. In some embodiments, the extracted script stream data is inspected for one or more malicious elements. In some embodiments, the malicious elements are identified based on heuristics. In some embodiments, points are assigned to each identified malicious element and if the aggregated points of all the identified malicious elements exceeds a certain threshold, then it is determined that a signature is to be generated based on at least a portion of the identified malicious elements.

At 606, a signature is generated for the PDF file. In some embodiments, in the event that the extracted script stream data within the PDF file is malicious (e.g., one or more malicious elements were found within the extracted scrip stream data), then a signature is generated based on at least a portion of the one or more elements of the PDF file that were identified to be malicious.

Figure 7:
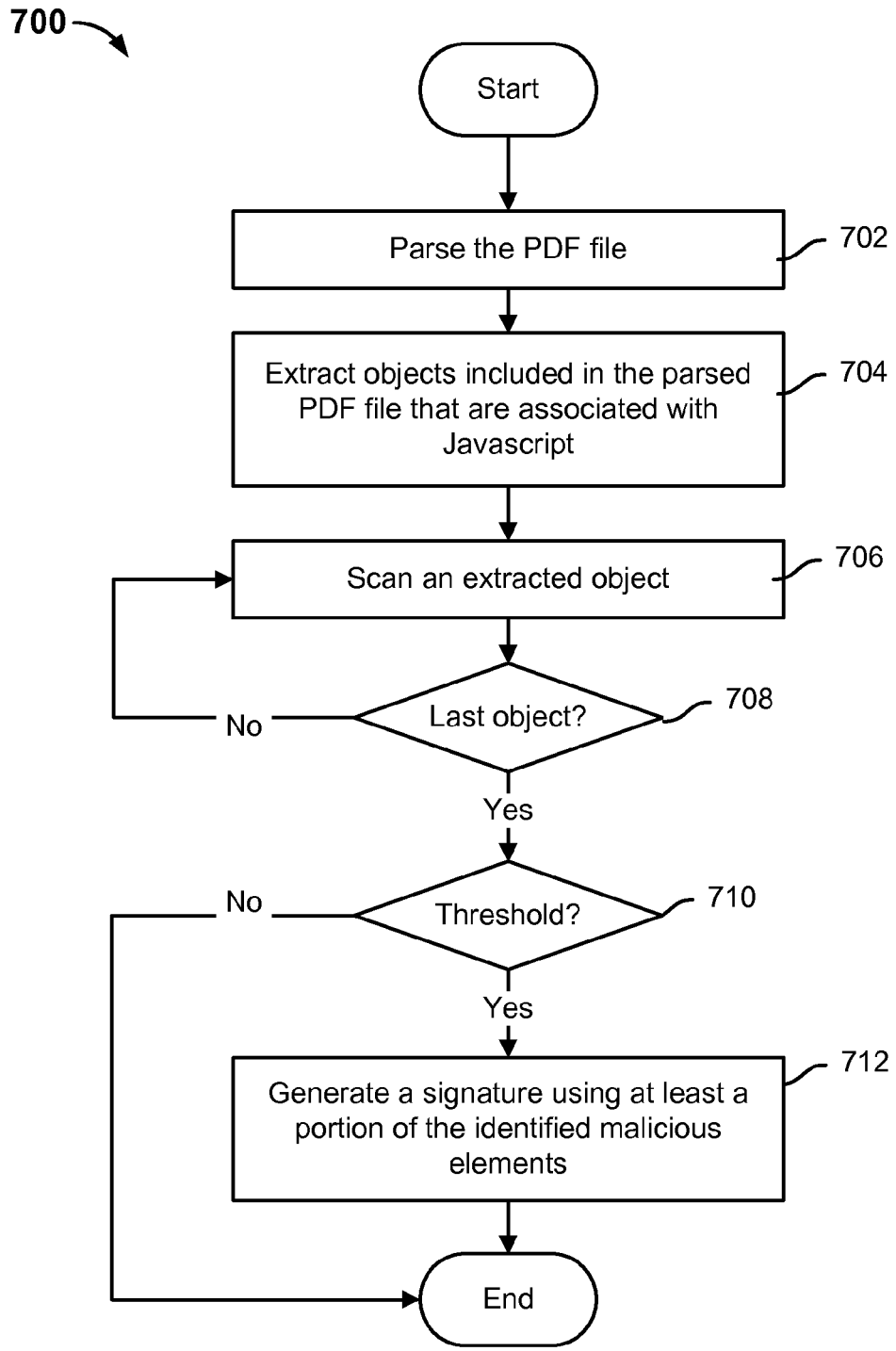
FIG. 7 is a flow diagram showing a process of generating malicious PDF file signatures in accordance with some embodiments.

FIG. 7 is a flow diagram showing a process of generating malicious PDF file signatures in accordance with some embodiments. In some embodiments, process 700 can be implemented, at least in part, using system 100. In some embodiments, at least part of process 700 can be used to implement 408 and 410 of process 400.

At 702, the PDF file is parsed. In various embodiments, the PDF file is known to be malicious.

At 704, objects included in the parsed PDF file that are associated with JavaScript are extracted. In some embodiments, objects (e.g., in the body section of the PDF file, such as body 504 of FIG. 5A) are inspected to determine whether they include JavaScript or a reference to another object that includes JavaScript. If an object does not include JavaScript but includes a reference to another object that potentially includes JavaScript, then the chain of referenced objects are traversed until a referenced object that includes JavaScript is found. For example, an object can be determined to be associated with/include JavaScript if the description table of the object indicates that JavaScript is included in the object (e.g., "/JS" or "/JavaScript"). In some embodiments, the extracted objects that are identified to include JavaScript are included in a list of objects to be scanned for malicious elements.

At 706, an extracted object is scanned. In some embodiments, the object that includes JavaScript is scanned for one or more malicious elements within the definition of the object. In various embodiments, malicious elements are defined based on heuristic analysis. Contents of the object are compared to predefined malicious elements (e.g., that are stored in a database) to find matches. In some embodiments, identified malicious elements are temporarily stored so that they may be referred to later.

For example, a malicious element is an iFrame definition that includes a Universal Resource Locator (URL) associated with a blacklisted URL (e.g., a URL associated with a blacklisted web domain). To detect this malicious element, the object can first be inspected for an iFrame. If an iFrame is found, then a URL associated with the iFrame is extracted and compared against one or more blacklisted web domains. If the URL is not found to be in association with a blacklisted web domain, then this portion of the object (including the iFrame definition and URL) is not determined to be a malicious element. However, if the URL is found to be in association with a blacklisted web domain, then this portion of the object is determined to be a malicious element.

Another example of a malicious element is JavaScript that is configured to download a program/file (e.g., from a URL). Specifically, JavaScript that is configured to download an executable (.exe) file, a dynamic-link library (All) file, a document (.doc) file, and/or an ActiveX control file is presumed to be a malicious element.

At 708, it is determined whether there are more extracted objects to scan. If there are more objects to scan, then control passes to 706, where another extracted object is scanned for malicious elements. If there are no more objects to scan, then control passes to 710.

At 710, it is determined whether a threshold associated with a scoring system is met. If the threshold is met, control passes to 712 and a signature is then to be generated using at least a portion of the identified malicious elements. If the threshold is not met, then process 700 ends, and no signature is generated.

In some embodiments, points are assigned to each malicious element in a scoring system. Different points are assigned to different types of malicious elements. How many points are assigned to a particular type of malicious element is predetermined (e.g., by the administrator of system 100 based on heuristic analysis). For example, points assigned to various malicious elements can be updated over time to reflect the administrator's updated knowledge of the severity or likelihood of malicious effects of certain elements. After the malicious elements of the objects are identified, points are assigned to them based on their type. Then the points are aggregated (e.g., summed) and if the aggregated points exceed a threshold value (e.g., predetermined by the administrator of system 100), then it is determined that a signature is to be generated based on at least a portion of the identified malicious elements.

For example, in the scoring system: 20 points are assigned to a malicious element that is an iFrame associated with a blacklisted URL; 30 points are assigned to a JavaScript that is configured to download an .exe, .dll, or .doc file; and 80 points are assigned to a JavaScript that is configured to download an ActiveX control. In this example, if the sum of the points assigned to the malicious elements exceeds 150 points, then it is determined that a signature is to be generated, based at least in part on the identified malicious elements.

At 712, a signature is generated using at least a portion of the identified malicious elements. In some embodiments, at least a portion of one malicious element is used to generate the signature. In some embodiments, at least portions of more than one malicious element are used to generate the signature. In some embodiments, the length of the code of script associated with the malicious elements determines the specific technique by which to generate a signature. For example, if identified malicious elements included a URL associated with a blacklisted web domain and/or the ActiveX control code, then portions of either or both of the URL or the ActiveX control code can be used to generate a signature.

In some embodiments, the following procedure can be used to find candidate samples of PDF files from which to generate a signature: The URLs of the extracted objects are extracted and each extracted URL is compared to existing white, gray, and black lists of URLs. URL(s) that match those on the lists are candidates to be used for signature generation. File extensions of the data are also extracted and each extension is compared to existing white, gray, and black lists of file extensions. File extension(s) that match those on the lists are candidates to be used for signature generation. All of the ActiveX control code is searched for methods and Class Signatures (CL IDs) that are known to be commonly associated with malicious files. Activex Control code that matches the known methods and CL IDs are candidates for signature generation. The script data of the extracted objects are compared against a predetermined pattern list with script patterns that are commonly used by viruses (e.g., r"\.run\('command Vc echo"). Identified patterns are candidates for signature generation. Very long lines of data that contains a data string (e.g., <SCRIPT>k="f=String.fromCharCode(118, 97, 114, 32, 111, 61, 39, 39, 59, 102, 117, 110, 99, 105, 111 . . . ) are identified to be used as candidates for signature generation. Encoded data can be analyzed to try to identify any script virus hidden behind the encoding and if such a script virus can be identified, it can be used as a candidate for script generation.

In some embodiments, candidates samples are collected and periodically (e.g., every day) scanned to determine which, if any, can be used to generate signatures. For example, all candidate samples that are collected over the course of a day can be scanned. The candidate samples from which signatures have not been generated are used to generate signatures. The candidate samples from which signatures have been generated are not used to generate signatures.

Figures 8A, 8B:
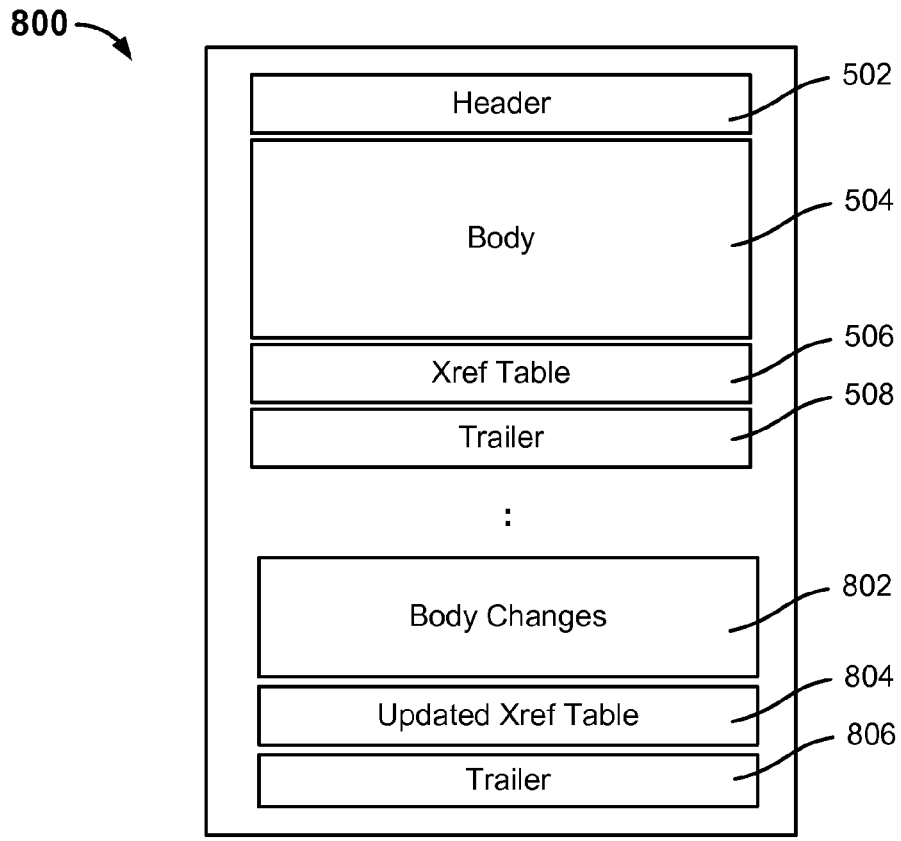
FIG. 8A is an example of a structure of a PDF file that has been incrementally saved in accordance with some embodiments.
FIG. 8B is an example showing a xref table in accordance with some embodiments.

FIG. 8A is an example of a structure of a PDF file that has been incrementally saved in accordance with some embodiments. Compared with the example of FIG. 5A, PDF file structure 800 is similar to PDF file structure 500 but includes the additional components of body changes 802, updated xref table 804, and trailer 806. These additional components reflect the PDF file's feature of supporting incremental saves. Incremental saves allow modifications to the original file without changing the content of the original saved document. As such, each time a modification is made to the PDF file, the modified content is appended to the end of the existing PDF file. As shown in the example of FIG. 8A, because body changes 802, updated xref table 804, and trailer 806 appear at the bottom of the PDF file 800 (e.g., they are the last appended content), they represent the content of the most recent incremental save to the PDF file. Due to the feature of incremental saves, a PDF file, such as PDF file 800, can include more than one xref table (e.g., xref table 506 and updated xref table 804). When there are multiple xref tables, the xref table that is the last appended to the file (i.e., the first xref table from the end of the PDF file), such as updated xref table 804, represents the most recent changes to the PDF file.

FIG. 8B is an example showing a xref table in accordance with some embodiments. In some embodiments, either or both of xref table 506 or updated xref table 508 can be represented by the example of FIG. 8B. As mentioned above, a xref table is an index by which the objects in the PDF file are located. As shown in the example, the xref table includes the following information: object IDs 816, offsets 818 in the PDF file that correspond to the locations of the objects, and flags 820 that indicate whether the objects are in use ("n") or free ("f"). For example, object 1 is located at offset 280 and is currently in use.

Figure 9:
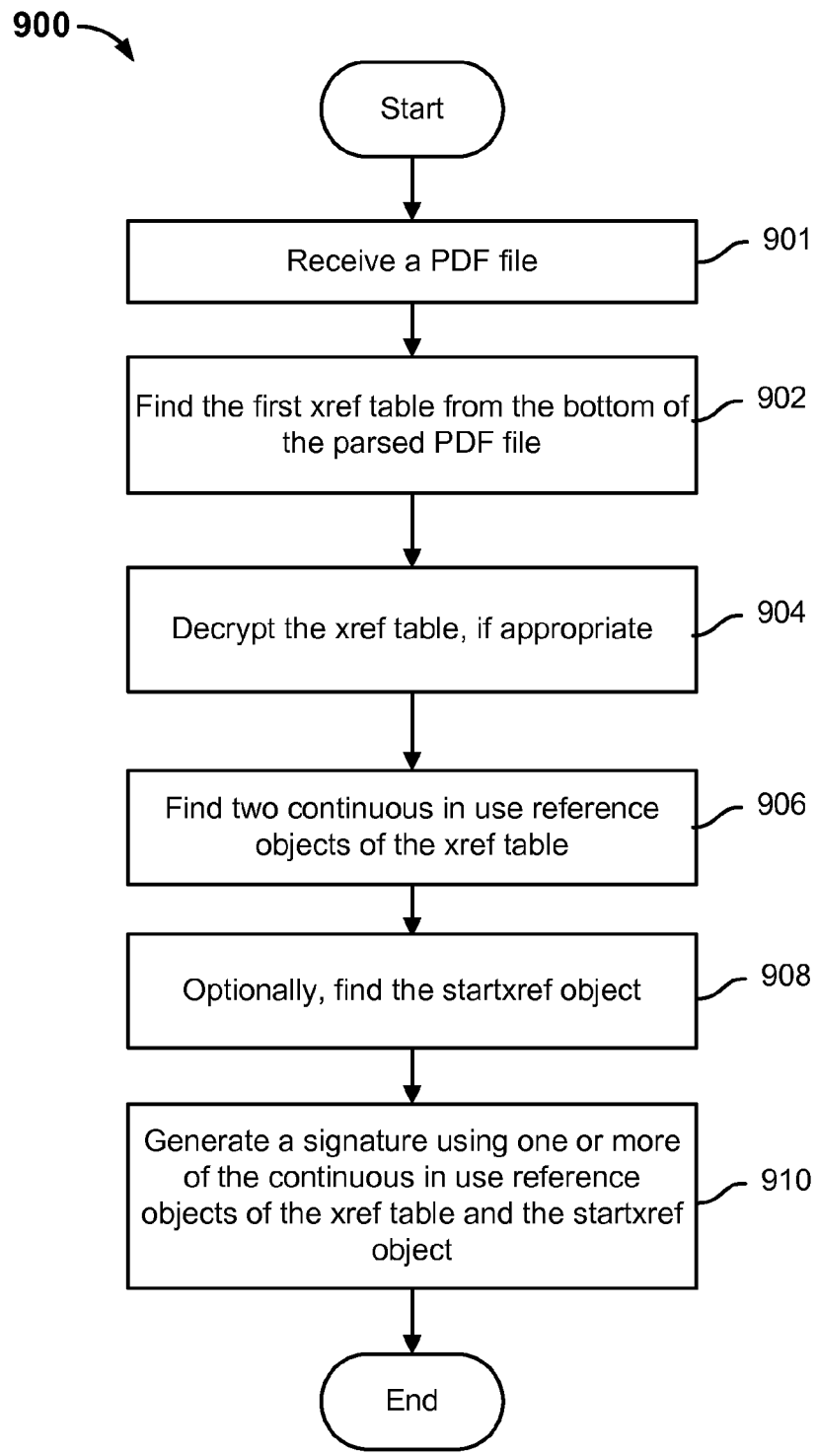
FIG. 9 is a flow diagram showing a process of generating malicious PDF file signatures in accordance with some embodiments.

FIG. 9 is a flow diagram showing a process of generating malicious PDF file signatures in accordance with some embodiments. In some embodiments, process 900 can be implemented, at least in part, using system 100. In some embodiments, at least part of process 900 can be used to implement 412 and 414 of process 400. In some embodiments, process 900 begins at the end of process 700.

At 901, a PDF file is received. In various embodiments, the PDF file is known to be a malicious PDF file and/or is received from a trusted source that collects PDF files that are identified as being malicious. In some embodiments, the PDF file is parsed (and/or de-obfuscated) so that it can be analyzed.

At 902, the first xref table from the bottom of the PDF file is found. The first xref table from the bottom of the PDF file is the last appended xref table to the file (e.g., updated xref table 804 of FIG. 8a) and reflects the latest incremental change to the PDF file. In various embodiments, it is presumed that this last appended xref table reflects any updates to the original PDF file that included malicious content.

At 904, the xref table is decrypted, if appropriate.

At 906, two continuous in use reference objects of the xref table are found. In some embodiments, pairs of entries of the xref table are scanned until two continuous in use reference objects are found. In various embodiments, the two continuous in use reference objects need also correspond to offsets greater than a predetermined threshold (e.g., 100). If the offsets of the reference objects are smaller than the predetermined threshold, then it is assumed the PDF file is too small and that the file is a false positive for a malicious PDF file.

At 908, optionally, the startxref object is found in the PDF file. The startxref points to the beginning of the last appended xref table and is generally found in the last appended trailer section (e.g., trailer 806 of FIG. 8A) of the PDF file.

At 910, a signature is generated using one or more of the continuous in use reference objects of the xref table and the startxref object.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
   parse a PDF file to extract script stream data embedded in the PDF file, wherein the PDF file is known to include malicious content; and
   determine whether to generate a signature associated with the PDF file based at least in part on at least a portion of the extracted script stream data:
   in the event that the signature associated with the PDF file is determined to be based at least in part on the at least portion of the extracted script stream data, automatically generate the signature associated with the PDF file based at least in part on the at least portion of the extracted script stream data, wherein the signature is configured to be matched against a potentially malicious PDF file; and
   in the event that the signature associated with the PDF file is determined not to be based at least in part on the at least portion of the extracted script stream data, automatically generate the signature associated with the PDF file from an identified cross-reference table from a plurality of cross-reference tables within the PDF file, wherein the identified cross-reference table is identified from the plurality of cross-reference tables based at least in part on a position of the identified cross-reference table relative to respective positions associated with one or more cross-reference tables other than the identified cross-reference table from the plurality of cross-reference tables; and
a memory coupled to the processor and configured to provide the processor with instructions.

2. The system of claim 1, wherein the processor is further configured to determine which objects, if any, within the PDF file includes JavaScript data.

3. The system of claim 1, wherein the processor is further configured to traverse through one or more objects within the PDF file to find an object associated with JavaScript data.

4. The system of claim 1, wherein determining whether to generate the signature associated with the PDF file based at least in part on the at least portion of the extracted script stream data includes:
   determining one or more portions of the extracted script stream data that are potentially malicious;
   assigning one or more numeric values corresponding to the one or more portions of the extracted script stream data that are potentially malicious, wherein the one or more numeric values are determined based on heuristics;
   aggregating the one or more numeric values into an aggregate numeric value; and
   determining whether the aggregate numeric value exceeds a threshold numeric value:
      in the event that the aggregate numeric value exceeds the threshold numeric value, determining to generate the signature based at least in part on the at least portion of the extracted script stream data; and
      in the event that the aggregate numeric value is equal to or less than the threshold numeric value, determining not to generate the signature based at least in part on the at least portion of the extracted script stream data.

5. The system of claim 4, wherein the one or more portions of the extracted script stream data that are potentially malicious include one or more of the following: an iFrame that includes an associated Uniform Resource Locator (URL) associated with a blacklisted domain and an iFrame that includes an associated URL associated with a webpage configured to download an .exe file, a .dll file, and/or a .doc file.

6. The system of claim 1, wherein the processor is further configured to de-obfuscate the PDF file.

7. The system of claim 1, wherein the processor is configured to automatically generate the signature for the PDF file based at least in part on at least a subset of portion(s) of a script within the PDF file that was determined to be malicious.

8. The system of claim 1, wherein the processor is configured to automatically generate the signature for the PDF file based at least in part on selecting a plurality of patterns exceeding a suspicious threshold to automatically generate the signature using the plurality of patterns.

9. The system of claim 1, wherein the processor is configured to automatically generate the signature for the PDF file based at least in part on selecting a plurality of patterns exceeding a suspicious threshold to automatically generate the signature using the plurality of patterns, wherein each of the plurality of patterns is based on different threshold numeric values.

10. A method, comprising:
    parsing a PDF file to extract script stream data embedded in the PDF file, wherein the PDF file is known to include malicious content; and
    determining whether to generate a signature associated with the PDF file based at least in part on at least a portion of the extracted script stream data:
    in the event that the signature associated with the PDF file is determined to be based at least in part on the at least portion of the extracted script stream data, automatically generating the signature associated with the PDF file based at least in part on the at least portion of the extracted script stream data, wherein the signature is configured to be matched against a potentially malicious PDF; and
    in the event that the signature associated with the PDF file is determined not to be based at least in part on the at least portion of the extracted script stream data, automatically generating the signature associated with the PDF file from an identified cross-reference table from a plurality of cross-reference tables within the PDF file, wherein the identified cross-reference table is identified from the plurality of cross-reference tables based at least in part on a position of the identified cross-reference table relative to respective positions associated with one or more cross-reference tables other than the identified cross-reference table from the plurality of cross-reference tables.

11. The method of claim 10, wherein parsing the PDF file to extract script stream data includes determining which objects, if any, within the PDF file include JavaScript data.

12. The method of claim 10, wherein parsing the PDF file to extract script stream data includes traversing through one or more objects within the PDF file to find an object associated with JavaScript data.

13. The method of claim 10, wherein determining whether to generate the signature associated with the PDF file based at least in part on the at least portion of the extracted script stream data includes:
    detecting one or more portions of the extracted script stream data that are potentially malicious;
    assigning one or more numeric values corresponding to the one or more portions of the extracted script stream data that are potentially malicious, wherein the one or more numeric values are determined based on heuristics;
    aggregating the one or more numeric values into an aggregate numeric value; and
    determining whether the aggregate numeric value exceeds a threshold numeric value:
       in the event that the aggregate numeric value exceeds the threshold numeric value, determining to generate the signature based at least in part on the at least portion of the extracted script stream data; and
       in the event that the aggregate numeric value is equal to or less than the threshold numeric value, determining not to generate the signature based at least in part on the at least portion of the extracted script stream data.

14. The method of claim 13, wherein the one or more portions of the extracted script stream data that are potentially malicious include one or more of the following: an iFrame that includes an associated Uniform Resource Locator (URL) associated with a blacklisted domain and an iFrame that includes an associated URL associated with a webpage configured to download an .exe file, a .dll file, and/or a .doc file.

15. The method of claim 10, further comprising de-obfuscating the PDF file.

16. The method of claim 10, wherein automatically generating the signature for the PDF file is based at least in part on at least a subset of portion(s) of a script within the PDF file.

17. The method of claim 10, wherein automatically generating the signature for the PDF file includes selecting a plurality of patterns exceeding a suspicious threshold to automatically generate the signature using the plurality of patterns.

18. The method of claim 10, wherein automatically generating the signature for the PDF file includes selecting a plurality of patterns exceeding a suspicious threshold to automatically generate the signature using the plurality of patterns, wherein each of the plurality of patterns is based on different threshold numeric values.

19. A computer program product, the computer program product being embodied in a non-transitory computer readable storage medium and comprising computer instructions for:
- parsing a PDF file to extract script stream data embedded in the PDF file, wherein the PDF file is known to include malicious content; and
- determining whether to generate a signature associated with the PDF file based at least in part on at least a portion of the extracted script stream data:
- in the event that the signature associated with the PDF file is determined to be based at least in part on the at least portion of the extracted script stream data, automatically generating the signature associated with the PDF file based at least in part on the at least portion of the extracted script stream data, wherein the signature is configured to be matched against a potentially malicious PDF; and
- in the event that the signature associated with the PDF file is determined not to be based at least in part on the at least portion of the extracted script stream data, automatically generating the signature associated with the PDF file from an identified cross-reference table from a plurality of cross-reference tables within the PDF file, wherein the identified cross-reference table is identified from the plurality of cross-reference tables based at least in part on a position of the identified cross-reference table relative to respective positions associated with one or more cross-reference tables other than the identified cross-reference table from the plurality of cross-reference tables.

20. A system, comprising:
a processor configured to:
- determine that a PDF file does not include script stream data, wherein the PDF file is known to include malicious content;
- determine an identified cross-reference table from a plurality of cross-reference tables within the PDF file, wherein the identified cross-reference table is identified from the plurality of cross-reference tables based at least in part on a position of the identified cross-reference table relative to respective positions associated with one or more cross-reference tables other than the identified cross-reference table from the plurality of cross-reference tables; and
- automatically generate a signature for the PDF file from the identified cross-reference table; and a memory coupled to the processor and configured to provide the processor with instructions.

21. The system of claim 20, wherein the processor is further configured to de-obfuscate the PDF file.

22. The system of claim 20, wherein the identified cross-reference table is associated with a most recent incremental save associated with the PDF file.

23. The system of claim 20, wherein the processor is further configured to decrypt the identified cross-reference table.

24. The system of claim 20, wherein the processor is further configured to determine a startxref object and two continuous reference objects associated with a predetermined offset range within the identified cross-reference table.

25. The system of claim 20, wherein the processor is further configured to determine a startxref object and two continuous in use reference objects associated with a predetermined offset range within the identified cross-reference table.

26. The system of claim 20, wherein the processor is further configured to determine a startxref object and two continuous reference objects associated with a predetermined offset range within the identified cross-reference table and to automatically generate the signature associated with the PDF file based at least in part on the startxref object and the two continuous reference objects associated with the predetermined offset range within the identified cross-reference table.

* * * * *